(12) United States Patent
Ha et al.

(10) Patent No.: US 8,829,091 B2
(45) Date of Patent: Sep. 9, 2014

(54) POLYCARBONATE RESIN COMPOSITION AND MOLDED ARTICLE USING THE SAME

(75) Inventors: Doo Han Ha, Uiwang-si (KR); Young Chul Kwon, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 334 days.

(21) Appl. No.: 13/269,653

(22) Filed: Oct. 10, 2011

(65) Prior Publication Data
US 2012/0129993 A1 May 24, 2012

(30) Foreign Application Priority Data
Nov. 23, 2010 (KR) .................. 10-2010-0116919

(51) Int. Cl.
| | | |
|---|---|---|
| C08L 69/00 | (2006.01) | |
| C08L 83/10 | (2006.01) | |
| C08L 83/04 | (2006.01) | |
| C08G 77/448 | (2006.01) | |
| C08L 83/00 | (2006.01) | |
| C08L 33/04 | (2006.01) | |

(52) U.S. Cl.
CPC .............. *C08L 69/00* (2013.01); *C08G 77/448* (2013.01); *C08L 83/00* (2013.01); *C08L 33/04* (2013.01); *C08L 83/04* (2013.01)
USPC .......... 524/230; 524/268; 524/269; 525/92 A; 525/101; 525/464

(58) Field of Classification Search
None
See application file for complete search history.

(56) References Cited

U.S. PATENT DOCUMENTS

| | | | |
|---|---|---|---|
| 3,686,355 A | 8/1972 | Gaines et al. | |
| 4,027,073 A | 5/1977 | Clark | |
| 4,045,514 A | 8/1977 | Iwahashi et al. | |
| 4,263,416 A | 4/1981 | Liu et al. | |
| 4,287,315 A | 9/1981 | Meyer et al. | |
| 4,289,859 A * | 9/1981 | Kalinowski et al. | 525/104 |
| 4,400,333 A | 8/1983 | Neefe | |
| 4,554,302 A * | 11/1985 | Miller | 524/233 |
| 4,745,029 A | 5/1988 | Kambour | |
| 4,906,696 A | 3/1990 | Fischer et al. | |
| 5,061,558 A | 10/1991 | Fischer et al. | |
| 5,200,492 A | 4/1993 | Ohnaga et al. | |
| 5,280,070 A | 1/1994 | Drzewinski et al. | |
| 5,284,916 A | 2/1994 | Drzewinski | |
| 5,292,809 A | 3/1994 | Drzewinski et al. | |
| 5,449,557 A | 9/1995 | Liebler et al. | |
| 5,473,019 A | 12/1995 | Siol et al. | |
| 5,530,083 A * | 6/1996 | Phelps et al. | 528/25 |
| 6,001,929 A * | 12/1999 | Nodera et al. | 525/92 E |
| 6,252,002 B1 | 6/2001 | Yamada et al. | |
| 6,576,706 B1 * | 6/2003 | Nodera et al. | 525/67 |
| 6,646,068 B2 | 11/2003 | O'Brien et al. | |
| 7,067,188 B1 | 6/2006 | Yang et al. | |
| 7,294,659 B2 | 11/2007 | Yatake | |
| 7,365,125 B2 | 4/2008 | Govaerts et al. | |
| 7,553,895 B2 | 6/2009 | An et al. | |
| 7,732,515 B2 | 6/2010 | Jang et al. | |
| 2002/0042483 A1 | 4/2002 | Vanderbilt | |
| 2003/0065071 A1 * | 4/2003 | Scholten | 524/136 |
| 2005/0101757 A1 | 5/2005 | Glasgow et al. | |
| 2006/0004154 A1 | 1/2006 | DeRudder et al. | |
| 2006/0030647 A1 | 2/2006 | Ebeling et al. | |
| 2006/0047037 A1 | 3/2006 | Kawato et al. | |
| 2006/0074156 A1 | 4/2006 | Ebeling et al. | |
| 2007/0105994 A1 | 5/2007 | Li et al. | |
| 2007/0213452 A1 * | 9/2007 | Kawato et al. | 524/502 |
| 2007/0293608 A1 | 12/2007 | Chen et al. | |
| 2008/0015291 A1 | 1/2008 | Siripurapu et al. | |
| 2008/0029744 A1 | 2/2008 | Jansen et al. | |
| 2008/0227896 A9 | 9/2008 | Ebeling et al. | |
| 2009/0023871 A9 | 1/2009 | Fujiguchi et al. | |
| 2009/0080079 A1 | 3/2009 | Kogure et al. | |
| 2009/0118402 A1 | 5/2009 | Jang et al. | |
| 2009/0318629 A1 | 12/2009 | Adoni et al. | |
| 2010/0029855 A1 | 2/2010 | Matsuoka et al. | |
| 2010/0113697 A1 * | 5/2010 | Lee et al. | 525/63 |
| 2010/0152357 A1 | 6/2010 | Kwon et al. | |
| 2010/0168272 A1 | 7/2010 | Park et al. | |
| 2010/0240831 A1 | 9/2010 | Kim et al. | |
| 2010/0256288 A1 | 10/2010 | Kim et al. | |
| 2011/0009524 A1 | 1/2011 | Kwon et al. | |
| 2011/0021677 A1 | 1/2011 | Kwon et al. | |
| 2011/0040019 A1 | 2/2011 | Kwon et al. | |
| 2011/0160380 A1 | 6/2011 | Kwon et al. | |
| 2013/0137801 A1 | 5/2013 | Ha et al. | |

FOREIGN PATENT DOCUMENTS

| | | |
|---|---|---|
| CN | 101434749 A | 5/2009 |
| CN | 101735586 A | 6/2010 |
| EP | 1010725 A2 | 6/2000 |
| EP | 1533340 A1 | 5/2005 |

(Continued)

OTHER PUBLICATIONS

European Search Report in commonly owned European Application No. 09180634 dated Feb. 2, 2010, pp. 1-3.
Xu, "Predicition of Refractive Indices of Linear Polymers by a four-descriptor QSPR model", Polymer, 45 (2004) pp. 8651-8659.
Office Action in commonly owned U.S. Appl. No. 12/642,904 mailed Dec. 14, 2011, pp. 1-9.
Chinese Office Action in commonly owned Chinese Application No. 200910211954 dated Jun. 23, 2011, pp. 1-5.
English translation of Chinese Office Action in commonly owned Chinese Application No. 200910211954 dated Jun. 23, 2011, pp. 1-5.
Katrizky et al., "Correlation and Prediction of the Refractive Indices of Polymers by QSPR", Journal of Chemical Information and Computer Sciences, pp. 1171-1176, (1998).

(Continued)

*Primary Examiner* — David Buttner

(74) *Attorney, Agent, or Firm* — Additon, Higgins & Pendleton, P.A.

(57) ABSTRACT

A polycarbonate resin composition includes about 100 parts by weight of a base resin including a polycarbonate resin (A) and a polycarbonate-polysiloxane copolymer (B); and about 0.1 to about 10 parts by weight of polyalkylaryl siloxane (C) having a refractive index of about 1.42 to about 1.59. The composition can exhibit high gloss and blackness and can have excellent impact resistance, heat resistance, light resistance, and mar resistance (resistance to fine scratches).

12 Claims, 1 Drawing Sheet

(56) References Cited

FOREIGN PATENT DOCUMENTS

| | | | |
|---|---|---|---|
| EP | 1555296 A1 | 7/2005 | |
| EP | 2204412 A1 | 7/2010 | |
| GB | 2057464 A | 4/1981 | |
| JP | 04-023856 A | 1/1992 | |
| JP | 04-359954 A | 12/1992 | |
| JP | 06-313089 A | 11/1994 | |
| JP | 2001-049072 A | 2/2001 | |
| JP | 2002-080676 | 3/2002 | |
| JP | 2005-247999 A | 9/2005 | |
| JP | 2006-131833 | 5/2006 | |
| JP | 2006-249288 A | 9/2006 | |
| JP | 2006-249292 A | 9/2006 | |
| JP | 2006-257126 | 9/2006 | |
| JP | 2006-257284 A | 9/2006 | |
| JP | 2006-342246 A | 12/2006 | |
| JP | 2010202825 | * | 9/2010 |
| KR | 10-2000-0048033 A | 7/2000 | |
| KR | 2004-79118 A | 9/2004 | |
| KR | 10-2006-0050497 A | 5/2006 | |
| KR | 10-0767428 B1 | 10/2007 | |
| KR | 10-2009-0018827 A | 2/2009 | |
| KR | 10-2009-0020648 A | 2/2009 | |
| KR | 10-2009-0026339 | 3/2009 | |
| KR | 10-2009-0035031 A | 4/2009 | |
| KR | 10-2009-0066204 | 6/2009 | |
| KR | 10-2009-0066204 A | 6/2009 | |
| KR | 10-2010-0049458 A | 5/2010 | |
| WO | 2007/119920 A1 | 10/2007 | |
| WO | 2007/140101 A1 | 12/2007 | |
| WO | 2008/081791 A1 | 7/2008 | |
| WO | 2009/078593 A1 | 6/2009 | |
| WO | 2009/078602 A1 | 6/2009 | |
| WO | 2009/113762 A2 | 9/2009 | |
| WO | 2009/116722 A1 | 9/2009 | |
| WO | 2009/128601 A1 | 10/2009 | |
| WO | 2012/015109 A1 | 2/2012 | |

OTHER PUBLICATIONS

Office Action in commonly owned U.S. Appl. No. 12/631,018 mailed Nov. 8, 2011, pp. 1-10.
European Search Report in commonly owned European Application No. 10196806 dated Apr. 27, 2011, pp. 1-5.
International Search Report in counterpart International Application No. PCT/KR2010/008651 dated Aug. 25, 2011, pp. 1-2.
European Search Report in commonly owned European Application No. 08862371 dated Dec. 7, 2010, pp. 1-6.
International Search Report in commonly owned International Application No. PCT/KR2008/006870, dated May 28, 2009, pp. 1-2.
Office Action in commonly owned U.S. Appl. No. 12/980,718 mailed Jul. 17, 2013, pp. 1-8.
International Search Report in commonly owned International Application No. PCT/KR2008/007157, dated May 28, 2009, pp. 1-2.
Office Action in commonly owned U.S. Appl. No. 12/792,176 mailed Nov. 16, 2011, pp. 1-12.
International Search Report in commonly owned International Application No. PCT/KR2008/007825, dated Aug. 28, 2009, pp. 1-2.
Office Action in commonly owned U.S. Appl. No. 12/880,209 mailed Feb. 16, 2011, pp. 1-10.
Final Office Action in commonly owned U.S. Appl. No. 12/880,209 mailed Jul. 29, 2011, pp. 1-9.
Advisory Action in commonly owned U.S. Appl. No. 12/880,209 mailed Nov. 4, 2011, pp. 1-4.
International Search Report in commonly owned International Application No. PCT/KR2008/007820 dated Jul. 28, 2009, pp. 1-2.
Final Office Action in commonly owned U.S. Appl. No. 12/642,904 mailed Mar. 27, 2012, pp. 1-7.
Notice of Allowance in commonly owned U.S. Appl. No. 12/642,904 mailed Jul. 2, 2012, pp. 1-8.
European Search Report in commonly owned European Application No. 08873425.6 dated May 29, 2012, pp. 1-5.
Office Action in commonly owned U.S. Appl. No. 12/884,549 mailed Aug. 21, 2012, pp. 1-12.
Final Office Action in commonly owned U.S. Appl. No. 12/792,176 mailed Apr. 19, 2012, pp. 1-10.
Advisory Action in commonly owned U.S. Appl. No. 12/792,176 mailed Aug. 23, 2012, pp. 1-4.
Final Office Action in commonly owned U.S. Appl. No. 12/631,018 mailed Apr. 26, 2012, pp. 1-12.
Mark, Physical Properties of Polymers Handbook, 2nd Edition, Polymer Research Center and Department of Chemistry, University of Cincinnati, OH, (2007) Springer, pp. 5-7.
Polysciences, Inc., data sheet for benzyl acrylate, no date, pp. 1-2.
Guidechem, data sheet for RUBA-93, no date, pp. 1-2.
European Search Report and Written Opinion in counterpart European Application No. 11186686.9 dated Mar. 6, 2012, pp. 1-5.
Office Action in commonly owned U.S. Appl. No. 12/980,718 mailed Oct. 28, 2013, pp. 1-10.
Chinese Office Action in counterpart Chinese Application No. 201110314363.9, dated Nov. 5, 2013, pp. 1-9.
English translation of Chinese Office Action in counterpart Chinese Application No. 201110314363.9, dated Nov. 5, 2013, pp. 1-8.

* cited by examiner

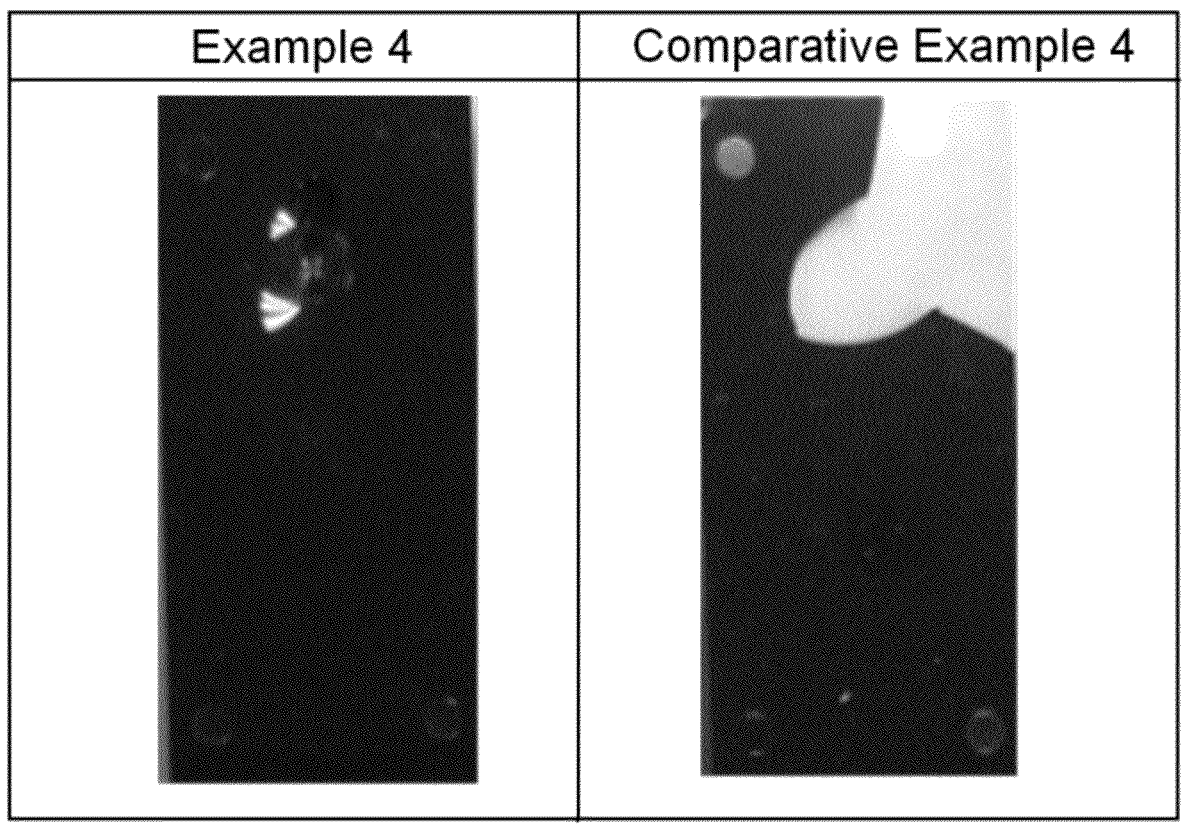

POLYCARBONATE RESIN COMPOSITION AND MOLDED ARTICLE USING THE SAME

CROSS-REFERENCE TO RELATED APPLICATIONS

This application claims priority under 35 USC Section 119 to and the benefit of Korean Patent Application No. 10-2010-0116919 filed Nov. 23, 2010, the entire disclosure of which is incorporated herein by reference.

FIELD OF THE INVENTION

The present invention relates to a polycarbonate resin composition that can have high gloss, impact resistance, and good surface properties, and a molded article using the same.

DESCRIPTION OF THE RELATED ART

Polycarbonate resins have excellent toughness, impact resistance, heat stability, self-extinguishability, dimensional stability and heat resistance, and thus are used for electric and electronic components, automobile components, lenses, and as an alternative to glass. However, in applications requiring transparency, polycarbonate reins have inferior scratch resistance to glass and become yellow when exposed to sunlight over time.

Polycarbonate rosin can be blended with a poly(methyl methacrylate) (PMMA) resin to improve scratch resistance. However, due to low compatibility and a significant difference in refractive index between the polycarbonate resin and the PMMA resin, an alloy thereof is opaque and has low quality in terms of external appearance, impact resistance and scratch resistance.

Recently, a separate coating process has been used to impart scratch resistance and high gloss texture. However, the coating process requires a plurality of stages, generates defects and toxic volatile components, and increases manufacturing costs.

In order to solve such problems, non-coating materials have been developed. Non-coating materials should have intrinsic high-gloss texture and intrinsic scratch resistance. However, resins having desired properties, such as color reproducibility, impact resistance, and heat resistance, as well as scratch resistance, have not been developed yet.

A resin composition including a polycarbonate resin, a polycarbonate-polysiloxane, and a modified (meth)acrylic copolymer can be satisfactory in terms of scratch resistance, chemical resistance and impact resistance, but can have inferior mar resistance, that is, resistance to fine scratches. Thus, the resin composition has limited use in components frequently touched or vulnerable to contamination.

Thus, there is a need for non-coating materials which can intrinsically (inherently) exhibit high-gloss texture, can have general scratch resistance and mar resistance, that is, resistance to fine scratches, and can exhibit excellent impact resistance, light resistance, heat resistance and chemical resistance.

SUMMARY OF THE INVENTION

The present invention provides a polycarbonate resin composition that can have high gloss and high impact resistant and also good surface properties. The composition can further have superior scratch resistance and excellent mar resistance (resistance to fine scratches) and can exhibit high gloss texture while maintaining transparency.

The composition includes about 100 parts by weight of a base resin including a polycarbonate resin (A) and a polycarbonate-polysiloxane copolymer (B); and about 0.1 to about 10 parts by weight of polyalkylaryl siloxane (C) having a refractive index of about 1.42 to about 1.59.

The polyalkylaryl siloxane (C) may have a weight average molecular weight of about 400 to about 1,000 g/mol.

The polyalkylaryl siloxane (C) may have a viscosity of about 20 to about 120 mPa·s at 25° C.

In exemplary embodiments, the base resin may include about 1 to about 99% by weight (wt %) of the polycarbonate resin (A) and about 1 to about 99 wt % of the polycarbonate-polysiloxane copolymer (B).

In exemplary embodiments, the polycarbonate-polysiloxane copolymer (B) may include about 1 to about 99 wt % of a polycarbonate block and about 1 to about 99 wt % of a polysiloxane block.

The base resin may further include about 40 wt % or less of a modified (meth)acrylic copolymer resin. The modified (meth)acrylic copolymer resin may have a refractive index of about 1.495 to about 1.590.

The modified (meth)acrylic copolymer resin may have a weight average molecular weight of about 5,000 to about 50,000 g/mol.

The modified (meth)acrylic copolymer resin may be an aromatic (meth)acrylate polymer, alicyclic (meth)acrylate polymer, or a combination thereof.

The modified (meth)acrylic copolymer resin may be a polymer including (d1) about 20 to about 100 wt % of an aromatic (meth)acrylate, alicyclic (meth)acrylate, or a combination thereof and (d2) about 0 to about 80 wt % of a monofunctional unsaturated monomer.

Examples of the monofunctional unsaturated monomer (d2) may include without limitation (meth)acrylic acid esters, unsaturated carboxylic acids, acid anhydrides, hydroxyl group containing esters, amides, nitriles, allyl glycidyl ethers, glycidyl methacrylates, styrenic monomers, and the like, and combinations thereof.

In one embodiment, the polycarbonate resin composition may further include a fatty acid amide surface conditioning agent. The fatty acid amide surface conditioning agent may be present in an amount of about 0.1 to about 5 parts by weight, based on about 100 parts by weight of the base resin.

In one embodiment, the polycarbonate resin composition may further include syndiotactic polystyrene. The syndiotactic polystyrene may be present in an amount of about 5 parts by weight or less, based on about 100 parts by weight of the base resin.

The resin composition may further include one or more additives. Examples of the additives include without limitation antimicrobial agents, heat stabilizers, antioxidants, release agents, photostablizers, inorganic additives, surfactants, coupling agents, plasticizers, admixtures, stabilizers, lubricants, anti-static agents, toning agents, fire-proofing agents, weather-proofing agents, coloring agents, UV absorbents, UV blocking agents, flame retardants, fillers, nucleating agents, adhesion aids, adhesives, and the like, which may be used alone or as mixtures.

The polycarbonate resin composition may have a total light transmittance of about 80% or more, a haze of about 10.0 or less, and a blackness (Lb) of about 28 or less.

The present invention also provides a molded article using the polycarbonate resin composition.

BRIEF DESCRIPTION OF THE DRAWING

FIG. 1 is a photograph of specimens according to Example 4 and Comparative Example 4 after a gate impact test.

DETAILED DESCRIPTION OF THE INVENTION

The present invention now will be described more fully hereinafter in the following detailed description of the invention with reference to the accompanying drawings, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, the term "(meth)acrylate" collectively includes "acrylate" and "methacrylate" unless otherwise indicated.

Further, unless otherwise indicated, the term "substitution" means that a hydrogen atom of a compound is substituted by a halogen atom, such as F, Cl, Br, and I, a hydroxyl group, a nitro group, a cyano group, an amino group, an azido group, an amidino group, a hydrazino group, a hydrazono group, a carbonyl group, a carbamyl group, a thiol group, an ester group, a carboxyl group or salt thereof, a sulfonic acid group or salt thereof, a phosphate group or salt thereof, a C1 to C20 alkyl group, a C2 to C20 alkenyl group, a C2 to C20 alkynyl group, a C1 to C20 alkoxy group, a C6 to C30 aryl group, a C6 to C30 aryloxy group, a C3 to C30 cycloalkyl group, a C3 to C30 cycloalkenyl group, a C3 to C30 cycloalkynyl group, or a combination thereof.

The present invention provides a polycarbonate resin composition including a polycarbonate resin (A), a polycarbonate-polysiloxane copolymer (B), and a polyalkylaryl siloxane (C).

A base resin includes resin components except for the polyalkylaryl siloxane (C).

In exemplary embodiments, the base resin may include the polycarbonate resin (A) and the polycarbonate-polysiloxane copolymer (B).

In exemplary embodiments, the base resin may include (A) the polycarbonate resin, (B) the polycarbonate-polysilane copolymer, and (D) a modified (meth)acrylic copolymer resin.

Hereinafter, each component will be described in detail.
(A) Polycarbonate Resin The polycarbonate resin may be prepared by reaction of one or more diphenols represented by Formula 1 with phosgene, halogen acid ester, carbonic acid ester, or a combination thereof.

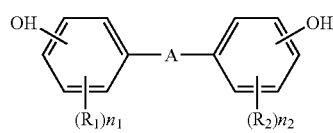

[Formula I]

wherein:

A is a single bond, linear or branched substituted or unsubstituted C1 to C30 alkylene, substituted or unsubstituted C2 to C5 alkenylene, substituted or unsubstituted C2 to C5 alkylidene, linear or branched substituted or unsubstituted C1 to C30 haloalkylene, substituted or unsubstituted C5 to C6 cycloalkylene, substituted or unsubstituted C5 to C6 cycloalkenylene, substituted or unsubstituted C5 to C10 cycloalkylidene, substituted or unsubstituted C6 to C30 arylene, linear or branched substituted or unsubstituted C1 to C20 alkoxylene, halogen acid ester, carbonic acid ester, CO, S, or SO2;

R1 and R2 are the same or different and are independently substituted or unsubstituted C1 to C30 alkyl or substituted or unsubstituted C6 to C30 aryl; and n1 and n2 are the same or different and each is independently an integer from 0 to 4.

The polycarbonate resin may have a repeat unit by combining at least two kinds of diphenols represented by Formula 1. Examples of the diphenols may include without limitation hydroquinone, resorcinol, 4,4'-dihydroxy diphenyl, 2,2-bis(4-hydroxyphenyl)propane (bisphenol A), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)ketone, bis(4-hydroxyphenyl)ether, and the like, and combinations thereof. In exemplary embodiments, 2,2-bis(4-hydroxyphenyl)propane, 2,2-bis(3-chloro-4-hydroxyphenyl)propane and/or 1,1-bis(4-hydroxyphenyl)cyclohexane can be used.

The polycarbonate resin may have a weight average molecular weight of about 10,000 to about 200,000 g/mol, for example, about 15,000 to about 80,000 g/mol, without being limited thereto.

The polycarbonate resin may be a homopolymer prepared using one kind of diphenol, a copolymer prepared using at least two different kinds of diphenols, or a combination of one or more homopolymers and/or one or more copolymers. Further, the polycarbonate resin may include a linear polycarbonate resin, a branched polycarbonate resin, a polyester-carbonate copolymer resin, or a combination thereof.

Examples of the linear polycarbonate resin may include bisphenol A polycarbonate resins. Examples of the branched polycarbonate resin may include compounds prepared by reaction of a multifunctional aromatic compound, such as trimellitic anhydride and trimellitic acid, with diphenols and carbonate. The multifunctional aromatic compound may be present in an amount of about 0.05 to about 2 mol % based on the total amount of the branched polycarbonate resin. Examples of the polyester-carbonate copolymer resin may include compounds prepared by reaction of a bifunctional carboxylic acid with diphenols and carbonate. Examples of the carbonate may include diaryl carbonate, such as diphenyl carbonate, and ethylene carbonate.

The polycarbonate resin may have a melt flow index (MFI) of about 3 to about 120 g/10 min at 310° C. and 1.2 kgf.

The base resin may include the polycarbonate resin in an amount of about 1 to about 99 wt %, for example about 30 to about 90 wt %, and as another example about 50 to about 80 wt %, based on about 100 wt % of the base resin including the polycarbonate resin (A) and the polycarbonate-polysiloxane copolymer (B) (and optionally other resins as discussed herein). In some embodiments, the base resin may include the polycarbonate resin (A) in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the amount of the polycarbonate resin (A) can be in a range from about any of the foregoing amounts to about any other of the foregoing amounts.

When the base resin includes the polycarbonate resin (A) in an amount within this range, the polycarbonate resin composition can exhibit an excellent balance of properties such as impact strength, heat resistance, and processibility.

(B) Polycarbonate-Polysiloxane Copolymer

The polycarbonate-polysiloxane copolymer includes a polycarbonate block and a polysiloxane block.

The polycarbonate block may include a structural unit derived from the polycarbonate resin (A).

The polysiloxane block may include a structural unit represented by Formula 2:

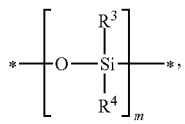

wherein:

$R^3$ and $R^4$ may be the same or different and are independently hydrogen, substituted or unsubstituted C1 to C20 alkyl, substituted or unsubstituted C2 to C20 alkenyl, substituted or unsubstituted C2 to C20 alkynyl, substituted or unsubstituted C1 to C20 alkoxy, substituted or unsubstituted C3 to C30 cycloalkyl, substituted or unsubstituted C3 to C30 cycloalkenyl, substituted or unsubstituted C3 to C30 cycloalkynyl, substituted or unsubstituted C6 to C30 aryl, substituted or unsubstituted C6 to C30 aryloxy, or NRR', wherein R and R' may be the same or different and are independently hydrogen or substituted or unsubstituted C1 to C20 alkyl, and $2 \leq m \leq 10{,}000$.

In Formula 2, m may be in a range from about 2 to about 10,000, for example from about 2 to about 1,000, as another example from about 10 to about 100, and as yet another example from about 25 to about 80. When m is within this range, excellent impact resistance can be obtained and proper viscosity can be maintained, providing favorable conditions for extrusion.

The polycarbonate-polysiloxane copolymer may include about 1 to about 99 wt %, for example about 40 to about 80 wt %, of the polycarbonate block and about 1 to about 99 wt %, for example about 20 to about 60 wt %, of the polysiloxane block, based on 100% of the polysiloxane-polycarbonate copolymer (B). In other exemplary embodiments, the polycarbonate-polysiloxane copolymer may include about 80 to about 95 wt % of the polycarbonate block and about 5 to about 20 wt % of the polysiloxane block.

In some embodiments, the polysiloxane-polycarbonate copolymer (B) may include the polycarbonate block in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the amount of the polycarbonate block can be in a range from about any of the foregoing amounts to about any other of the foregoing amounts.

In some embodiments, the polysiloxane-polycarbonate copolymer (B) may include the polysiloxane block in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the amount of the polysiloxane block can be in a range from about any of the foregoing amounts to about any other of the foregoing amounts.

When the polycarbonate-polysiloxane copolymer includes polycarbonate blocks and polysiloxane blocks in amounts within these ranges, excellent impact resistance can be obtained.

The polycarbonate-polysiloxane copolymer may have a weight average molecular weight of about 10,000 to about 30,000 g/mol, for example about 15,000 to about 22,000 g/mol. Within this range, excellent impact resistance can be obtained.

The polycarbonate-polysiloxane copolymer may reinforce the impact resistance of the polycarbonate resin composition which can be reduced when a modified (meth)acrylic copolymer is used.

The base resin may include the polycarbonate-polysiloxane copolymer in an amount of about 1 to about 99 wt %, for example about 10 to about 60 wt %, and as another example about 20 to about 50 wt %, based on about 100 wt % of the base resin including polycarbonate, resin (A) and polycarbonate-polysiloxane copolymer (B) (and optionally other resins as discussed herein). In some embodiments, the base resin may include the polysiloxane-polycarbonate copolymer (B) in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the amount of the polysiloxane-polycarbonate copolymer (B) can be in a range from about any of the foregoing amounts to about any other of the foregoing amounts.

When the polycarbonate resin composition includes the polysiloxane-polycarbonate copolymer (B) in an amount within this range, the polycarbonate resin composition can exhibit an excellent balance of properties such as impact strength, heat resistance, and processibility.

In one embodiment, a weight ratio between the polycarbonate resin (A) and the polycarbonate-polysiloxane copolymer (B) may be about 1:1 to 5:1, for example about 1:1 to 3:1.

(C) Polyalkylaryl Siloxane

The polyalkylaryl siloxane serves as a surface conditioning agent, which can minimize friction. The polyalkylaryl siloxane has a repeat unit represented by Formula 3:

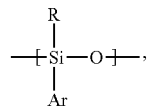

wherein:

R is substituted or unsubstituted C1 to C6 alkyl, and

Ar is substituted or unsubstituted C6 to C12 aryl.

The polyalkylaryl siloxane may have a refractive index of about 1.42 to about 1.59, for example about 1.47 to about 1.59, and as another example about 1.49 to about 1.59, and as another example about 1.49 to about 1.58, and as another example 1.495 to about 1.55. When the polyalkylaryl siloxane has a refractive within this range, the polycarbonate resin composition can exhibit an excellent balance between transparency and mar resistance.

The polyalkylaryl siloxane (C) may have a weight average molecular weight of about 400 to about 1,000 g/mol, for example about 600 to about 800 g/mol. Within this range, a bleed-out phenomenon may not occur on the surface and the polyalkylaryl siloxane can migrate or move to the surface.

In one embodiment, the polyalkylaryl siloxane (C) may have a viscosity of about 20 to about 120 mPa·s, for example about 30 to about 100 mPa·s at about 25° C. Within this range, a bleed-out phenomenon may not occur on the surface and the polyalkylaryl siloxane can migrate or move to the surface.

The polyalkylaryl siloxane (C) may include fluid-type polyalkylaryl siloxane.

Examples of the polyalkylaryl siloxane (C) may include, without being limited to, polymethylphenyl siloxane, polyethylphenyl siloxane, polypropylphenyl siloxane, polybutylphenyl siloxane, polypentylphenyl siloxane, polyhexylphenyl siloxane, and the like, and combinations thereof. In exemplary embodiments, the polyaryl siloxane (C) can be polymethylphenyl siloxane.

The polycarbonate resin composition can include the polyalkylaryl siloxane (C) in an amount of about 0.1 to about 10 parts by weight, for example about 1 to about 7 parts by weight, based on about 100 parts by weight of the base resin. In some embodiments, the polycarbonate resin composition can include the polyalkylaryl siloxane (C) in an amount of about 0.1, 0.2, 0.3, 0.4, 0.5, 0.6, 0.7, 0.8, 0.9, 1, 2, 3, 4, 5, 6, 7, 8, 9, or 10 parts by weight. Further, according to some embodiments of the present invention, the amount of the polyalkylaryl siloxane (C) can be in a range from about any of the foregoing amounts to about any other of the foregoing amounts.

When the amount of the polyalkylaryl siloxane (C) is less than about 0.1 parts by weight, sufficient mar resistance may not be obtained. When the amount of the polyalkylaryl siloxane (C) is more than about 10 parts by weight, haze can increase.

(D) Modified (Meth)Acrylic Copolymer Resin

The modified (meth)acrylic copolymer resin (D) may be added to the base resin.

The modified (meth)acrylic copolymer resin (D) may be a polymer of an aromatic (meth)acrylate, alicyclic (meth)acrylate, or a combination thereof. In one embodiment, the modified (meth)acrylic copolymer resin (D) may be a homopolymer of an aromatic (meth)acrylate or alicyclic (meth)acrylate. In another embodiment, the modified (meth)acrylic copolymer resin (D) may be a copolymer using at least two kinds of aromatic (meth)acrylates and/or alicyclic (meth)acrylates. In another embodiment, the modified (meth)acrylic copolymer resin (D) may be a copolymer of aromatic (meth)acrylate and/or alicyclic (meth)acrylate and a monomer polymerizable therewith. In another embodiment, the modified (meth) acrylic copolymer resin (D) may be a mixture of at least two of the above modified (meth)acrylic copolymer resins.

In exemplary embodiments, the modified (meth)acrylic copolymer resin (D) may be a polymer including about 20 to 100 wt %, for example about 20 to about 99.9 wt %, of aromatic (meth)acrylate, alicyclic (meth)acrylate, or a combination thereof (d1) and about 0 to about 80 wt %, for example about 0.1 to about 80 wt %, of a monofunctional unsaturated monomer (d2). In exemplary embodiments, the modified (meth)acrylic copolymer resin (D) may be a polymer including about 25 to about 45 wt % of the aromatic (meth)acrylate, alicyclic (meth)acrylate, or combination thereof (d1) and about 55 to about 75 wt % of the monofunctional unsaturated monomer (d2).

In some embodiments, the modified (meth)acrylic copolymer resin (D) may include an aromatic (meth)acrylate, alicyclic (meth)acrylate, or a combination thereof (d1) in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.1, 99.2, 99.3, 99.4, 99.5, 99.6, 99.7, 99.8, 99.9, or 100 wt %. Further, according to some embodiments of the present invention, the amount of the aromatic (meth)acrylate, alicyclic (meth)acrylate, or a combination thereof (d1) can be in a range from about any of the foregoing amounts to about any other of the foregoing amounts.

In some embodiments, the modified (meth)acrylic copolymer resin (D) may include the monofunctional unsaturated monomer (d2) in an amount of 0 wt % (the monofunctional unsaturated monomer is not present), or about 0 (the monofunctional unsaturated monomer is present in an amount greater than zero), 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the monofunctional unsaturated monomer (d2) can be in a range from about any of the foregoing amounts to about any other of the foregoing amounts.

When the modified (meth)acrylic copolymer resin (D) includes the aromatic (meth)acrylate, alicyclic (meth)acrylate, or a combination thereof (d1) and the monofunctional unsaturated monomer (d2) in an amount within this range, the modified (meth)acrylic copolymer resin may have an average refractive index of about 1.495 or more.

The aromatic (meth)acrylate and/or alicyclic (meth)acrylate (d1) refers to a (meth)acrylate compound substituted by one or more aromatic compounds, alicyclic compounds, or a combination thereof.

In one embodiment, the aromatic (meth)acrylate and/or alicyclic (meth)acrylate (d1) may have a structure represented by Formula 4, Formula 5, or a combination thereof

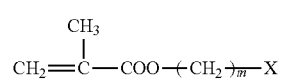

[Formula 4]

wherein:

m is an integer from 0 to 10, and

X is substituted or unsubstituted C6 to C30 aryl, substituted or unsubstituted C3 to C30 cycloalkyl, substituted or unsubstituted C3 to C30 cycloalkenyl, or substituted or unsubstituted C3 to C30 cycloalkynyl.

In exemplary embodiments, X is cyclohexyl, phenyl, methylphenyl, methylethylphenyl, propylphenyl, methoxyphenyl, cyclohexylphenyl, chlorophenyl group, bromophenyl, phenylphenyl, or benzylphenyl.

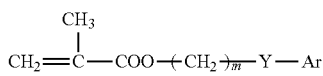

[Formula 5]

wherein:

m is an integer from 0 to 10,

Y is oxygen (O) or sulfur (S), and

Ar is substituted or unsubstituted C6 to C30 aryl, substituted or unsubstituted C3 to C30 cycloalkyl, substituted or unsubstituted C3 to C30 cycloalkenyl, or substituted or unsubstituted C3 to C30 cycloalkynyl.

In exemplary embodiments, Ar is cyclohexyl, phenyl, methylphenyl, methylethylphenyl, methoxyphenyl, cyclohexylphenyl, chlorophenyl, bromophenyl group, phenylphenyl, or benzylphenyl.

Examples of the aromatic and/or alicyclic acrylic compound may include without limitation cyclohexyl(meth)acrylate, ethylphenoxy(meth)acrylate, 2-ethylthiophenyl(meth)acrylate, 2-ethylaminophenyl(meth)acrylate, phenyl(meth)acrylate, benzyl(meth)acrylate, 2-phenylethyl(meth)acrylate, 3-phenylpropyl(meth)acrylate, 4-phenylbutyl(meth)acrylate, 2-2-methylphenylethyl(meth)acrylate, 2-3-methylphenylethyl(meth)acrylate, 2-4-methylphenylethyl(meth)acrylate, 2-4-propylphenylethyl(meth)acrylate, 2-(4-(1-methylethyl)phenyl)ethyl(meth)acrylate, 2-(4-methoxyphenyl)ethyl(meth)acrylate, 2-(4-cyclohexylphenyl)ethyl(meth)acrylate, 2-(2-chlorophenyl)ethyl(meth)acrylate, 2-(3-chlorophenyl)ethyl(meth)acrylate, 2-(4-chlorophenyl)ethyl(meth)acrylate, 2-(4-bromophenyl)ethyl(meth)acrylate, 2-(3-phenylphenyl)ethyl(meth)acrylate, 2-(4-benzylphenyl)ethyl(meth)acrylate, and the like, and combinations thereof. In exemplary embodiments, cyclohexyl(meth)acrylate, ethylphenoxy(meth)acrylate, and/or phenyl(meth)acrylate can be used.

A monomer copolymerizable with the aromatic and/or alicyclic acrylic compound may be the monofunctional unsaturated monomer (d2). Examples of the monofunctional unsaturated monomer (d2) may include, without being limited to, (meth)acrylic acid esters, unsaturated carboxylic acids, acid anhydrides, hydroxyl group containing esters, amides, nitriles, allyl glycidyl ethers, glycidyl methacrylates, styrenic monomers, and the like, which may be used alone or as mixtures.

Examples of the mono-functional unsaturated monomer may include, without being limited to, C1-C10 alkyl methacrylates such as methyl methacrylate, ethyl methacrylate, propyl methacrylate, and butyl methacrylate; C1-C10 alkyl acrylates such as methyl acrylate, ethyl acrylate, propyl acrylate, butyl acrylate, and 2-ethylhexyl acrylate; unsaturated carboxylic acids such as acrylic acid and methacrylic acid; acid anhydrides such as maleic anhydride; hydroxyl group containing acrylates such as 2-hydroxyethyl acrylate, 2-hydroxypropyl acrylate, and monoglycerol acrylate; amides such as acrylamide and methacrylamide; nitriles such as acrylonitrile and methacrylonitrile; allyl glycidyl ether; glycidyl methacrylate; styrenic monomers such as styrene, α-methylstyrene; and the like, and combinations thereof. In exemplary embodiments, the mono-functional unsaturated monomer may include an alkyl methacrylate and/or alkyl acrylate.

Examples of the modified (meth)acrylic copolymer may include without limitation a copolymer of methyl methacrylate and phenyl methacrylate.

The modified (meth)acrylic copolymer may be polymerized by conventional bulk polymerization, emulsion polymerization, or suspension polymerization.

The modified (meth)acrylic copolymer may have a higher refractive index than a common acrylic polymer. That is, the modified (meth)acrylic copolymer may have the same refractive index as the polycarbonate resin. In one embodiment, the modified (meth)acrylic copolymer may have a refractive index of about 1.495 to about 1.590, for example about 1.51 to about 1.59. When the modified (meth)acrylic copolymer has an increased refractive index, i.e., when the modified (meth)acrylic copolymer has a refractive index in the above range, compatibility and transparency can be improved, so that it can be well blended with the polycarbonate resin. Accordingly, the polycarbonate resin has improved scratch resistance and high transparency and is highly colored.

In one embodiment, the modified (meth)acrylic copolymer resin (D) may have a weight average molecular weight of about 5,000 to about 25,000 g/mol, for example about 7,000 to about 20,000 g/mol. Within this range, the polycarbonate resin composition can exhibit high transparency.

In another embodiment, the modified (meth)acrylic copolymer resin (D) may have a weight average molecular weight of about 25,000 to about 50,000 g/mol. Within this range, the polycarbonate resin composition can exhibit semi-transparency, and thus is used for a material which does not require high transparency.

The modified (meth)acrylic copolymer resin (D) may be optionally added to the base resin. The base resin can include the modified (meth)acrylic copolymer resin (D) in an amount of about 40 wt % or less, for example about 10 to about 30 wt %, based on about 100 wt % of the base resin including polycarbonate resin (A) and polycarbonate-polysiloxane copolymer (B) (and other resins when present such as the modified (meth)acrylic copolymer resin (D)). In some embodiments, the base resin may include the modified (meth)acrylic copolymer resin (D) in an amount of 0 wt % (the modified (meth)acrylic copolymer resin (D) is not present), or about 0 (the modified (meth)acrylic copolymer resin (D) is present in an amount greater than zero), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the amount of the modified (meth)acrylic copolymer resin (D) can be in a range from about any of the foregoing amounts to about any other of the foregoing amounts.

When the base resin includes the modified (meth)acrylic copolymer resin (D) in an amount within this range, excellent compatibility, impact resistance, and scratch resistance can be obtained.

In one embodiment, the polycarbonate-polysiloxane copolymer (B) and the modified (meth)acrylic copolymer resin (D) may be mixed at a weight ratio of about 3:1 to about 1:1. Within this range, the polycarbonate resin composition can exhibit an excellent balance of properties such as impact resistance, scratch resistance, transparency, heat resistance, fluidity, and coloring performance.

(E) Other Additives

The polycarbonate resin composition may further include a fatty acid amide surface conditioning agent.

The tatty acid amide surface conditioning agent may be a C15 to C30 aliphatic alkyl amide. Examples of the fatty acid amide surface conditioning agent may include, without being limited to, stearamide, erucamide, oleamide, behenamide, and the like, and compositions thereof.

The polycarbonate resin composition may include the fatty acid amide surface conditioning agent in an amount of about 0.1 to about 5 parts by weight, based on about 100 parts by weight of the base resin. Within this range, superior mar resistance can be obtained.

The polycarbonate resin composition may further include syndiotactic polystyrene.

Examples of the syndiotactic polystyrene may include, without being limited to, polystyrene, poly(p-methylstyrene), poly(m-methylstyrene), poly(p-ter-butylstyrene), poly(p-chlorostyrene), poly(m-chlorostyrene), poly(p-fluorostyrene), poly(p-cyclohexylstyrene), and the like, and combinations thereof.

The polycarbonate resin composition may include the syndiotactic polystyrene in an amount of about 5 parts by weight or less (when present in an amount greater than zero parts by weight), for example about 1 to about 5 parts by weight, based on about 100 parts by weight of the base resin. Within this range, the resin can have improved impact resistance.

The polycarbonate resin composition may further include one or more other additives. Examples of the additives include without limitation anti-dripping agents, antimicrobial agents, heat stabilizers, antioxidants, release agents, photo-stablizers, inorganic additives, surfactants, coupling agents, plasticizers, admixtures, stabilizers, lubricants, anti-static agents, toning agents, fire-proofing agents, weather-proofing agents, coloring agents, UV absorbents, UV blocking agents, flame retardants, fillers, nucleating agents, adhesion aids, adhesives, and the like, and combinations thereof.

Examples of the anti-dripping agent may include without limitation polytetrafluoroethylene terephthalate. However, when the anti-dripping agent is added, transparency can be reduced. Thus, the anti-dripping agent may be present in an amount of 2 parts by weight or less (when present in an amount greater than zero parts by weight), for example about 1.5 parts by weight or less, as another example about 1 part by weight or less, and as another example about 0.8 parts by weight or less, based on about 100 parts by weight of the base resin. When the amount exceeds this range, transparency can be reduced.

Examples of the antioxidant may include without limitation phenol antioxidants, phosphite antioxidants, thioether antioxidants, amine antioxidants, and the like, and combinations thereof.

Examples of the release agent may include without limitation fluorine containing polymers, silicone oils, metal salts of stearic acid, metal salts of montanic acid, montanic acid ester waxes, polyethylene waxes, and the like, and combinations thereof.

Examples of the weather-proofing agent may include without limitation benzophenone weather-proofing agents, amine weather-proofing agents, and the like, and combinations thereof.

Examples of the coloring agent may include without limitation dyes, pigments, and the like, and combinations thereof.

Examples of the UV blocking agents may include without limitation titanium oxide ($TiO_2$), carbon black, and the like, and combinations thereof. The carbon black may be a conductive carbon black. Examples of conductive carbon black may include without limitation graphitized carbon, furnace black, acetylene black, ketchen black, and the like, and combinations thereof.

Examples of the filler may include without limitation glass fiber, carbon fiber, silica, mica, alumina, clay, calcium carbonate, calcium sulfate, glass beads, and the like, and combinations thereof.

Examples of the nucleating agent may include without limitation talc, clay, and the like, and combinations thereof.

The additives may be properly added as long as properties of the polycarbonate resin composition are not deteriorated. The additives may be present in an amount of about 40 parts by weight or less (and when present in an amount greater than zero parts by weight) based on about 100 parts by weight of the polycarbonate resin composition. In one embodiment, the additives may be present in an amount of about 0.1 to about 30 parts by weight.

The polycarbonate resin composition can have excellent scratch resistance and mar resistance, which is resistance to fine scratches, can have a high gloss texture while maintaining transparency, and can have an excellent balance of properties such as color reproducibility, impact resistance, heat resistance, gloss, scratch resistance, and transparency. Further, polycarbonate resin composition can be properly used as a non-coating material. Further, when products requiring high gloss and non-coating are manufactured using the polycarbonate resin composition, a coating process is not needed, which can significantly reduce costs and be environmentally friendly.

The polycarbonate resin composition can have excellent intrinsic impact strength and thus need not include an impact reinforcing agent or a rubber component. The rubber component includes rubber modified copolymers, such as ABS, MABS, AES, and AAS. When the resin composition includes the impact reinforcing agent or the rubber component, its transparency can be reduced.

The polycarbonate resin composition may be prepared by any known method of preparing a resin composition. For example, the above components and the other optional additives can be mixed at the same time, subjected to melt extrusion in an extruder, and formed into pellets.

The present invention also provides a molded article using the polycarbonate resin composition. The polycarbonate resin composition may be formed into molded articles via various processes, such as injection molding, blow molding, extrusion molding, and heat molding. In particular, the composition can be useful for molded articles, e.g., electric and electronic components and automobile components requiring impact resistance, scratch resistance, transparency, and heat resistance.

Hereinafter, the constitution and functions of the present invention will be explained in more detail with reference to the following examples. These examples are provided for illustration only and are not to be in any way construed as limiting the present invention.

EXAMPLES

Details of components used in Examples and Comparative Examples are described as follows.

(A) Polycarbonate Resin

Infino having an MFI of 8 g/10 min at 310° C. and 1.2 kgf produced by Cheil Industries Inc. is used.

(B) Polycarbonate-Polysiloxane

Tarflon produced by Idemitsu Chemicals is used.

(C) Polyalkylaryl Siloxane (C-1) TSF437 having a refractive index of 1.499 produced by GE Toshiba Silicones is used.

(C-2) SILREN M1010 having a refractive index of 1.529 produced by Korea Biogen Co., Ltd. is used.

(C') Fatty acid ester, Unister H-476, produced by NOF Corporation is used.

(C") Amino terminated polysiloxane, XF42-C2999, having a refractive index 1.406 produced by GE Toshiba Silicones is used.

(D) Modified (Meth)Acrylic Copolymer Resin

A copolymer having a weight average molecular weight of 20,000 g/mol prepared by general suspension polymerization of 65 wt % of methyl methacrylate and 35 wt % of phenyl methacrylate is used.

(E) Fatty Acid Amide Surface Conditioning Agent

Oleamide, Finawax OK, produced by Fine Chemicals Inc. is used.

(F) Syndiotactic Polystyrene

Syndiotactic polystyrene, Zarex 130ZC, produced by Idemitsu Chemicals is used.

Examples 1 to 10 and Comparative Examples 1 to 6

The above components are mixed according to compositions listed in Table 1, and 0.2 parts by weight of carbon black is added thereto, followed by extrusion using a 45 Φ twin screw extruder and drying in a dryer at 100° C. for 4 hours to prepare pellets. The pellets are dried at 80° C. for 4 hours and subjected to injection-molding to prepare ASTM dumbbell specimens using a 6 oz injection molding machine at a cylinder temperature of 210° C. to 230° C., a mold temperature of 100° C., and a molding cycle of 30 seconds. Physical properties of the specimens are measured as follows and results are shown in Tables 1 to 3.

(1) Blackness

L value is measured based on ASTM D1925 using Konica Minolta CCM.

(2) Notched-IZOD Impact Strength

Notched-IZOD is measured using a specimen having a thickness of ⅛"according to ASTM D256 (kgf·cm/cm).

(3) Ball Type Scratch Profile (BSP) Width

A load of 1 kgf is applied to a specimen using a tungsten carbide stylus having a spherical tip with a diameter of 0.7 mm and a scratch is formed on the specimen at a speed of 75 mm/min, followed by observation of profile and measurement of scratch width using a surface profiler (μm).

(4) Gate Impact

After injection-molding a pin point 2T specimen, a load of 2 kgf is applied to a gate portion of the specimen by free fall using a metal tip having a diameter of 10 mm, thereby measuring impact resistance on the gate portion (%).

(5) Mar Resistance

A specimen is rubbed 500 times using a superfine fiber cloth, followed by observation of appearance using an abrasion rubbing tester.

1: Best
3: Good
5: Moderate
7: Bad
9: Worst

As used herein, composition having mar resistance (resistance to fine scratches) can include compositions which exhibit a mar resistance determined using the above test of 6 or less.

TABLE 1

|  |  | Example 1 | Example 2 | Example 3 | Comparative Example 1 | Comparative Example 2 |
|---|---|---|---|---|---|---|
| (A) PC |  | 40 | 40 | 40 | 40 | 40 |
| (B) PC-Si |  | 40 | 40 | 40 | 40 | 40 |
| (C-1) |  | 1 | — | 1 | — | — |
| (C-2) |  | — | 1 | — | — | — |
| (C') |  | — | — | — | — | 1 |
| (D) Modified PMMA |  | 20 | 20 | 20 | 20 | 20 |
| (E) Fatty acid amide |  | — | — | 1 | — | — |
| Blackness (L value) |  | 25 | 25 | 25 | 25 | 25 |
| N-IZ (⅛") | kg · cm/cm | 4.5 | 4.5 | 2.5 | 4.5 | 3.0 |
| BSP width | μm | 255 | 255 | 255 | 255 | 255 |
| Mar resistance | Grade | 4 | 4 | 6 | 9 | 9 |

As shown in Table 1, the polycarbonate resin compositions including polyalkylaryl siloxane according to Examples 1 to 3 have remarkably improved mar resistance as compared with those according to Comparative Examples 1 and 2.

TABLE 2

|  |  | Example 4 | Example 5 | Example 6 | Comparative Example 3 | Comparative Example 4 |
|---|---|---|---|---|---|---|
| (A)PC |  | 75 | 75 | 75 | 75 | 75 |
| (B)PC-Si |  | 25 | 25 | 25 | 25 | 25 |
| (C-1) |  | 1 | — | — | — | — |
| (C-2) |  | — | 1 | 1 | — | — |
| (C') |  | — | — | — | — | 1 |
| (E) Fatty acid amide |  | — | — | 1 | — | — |
| Blackness (L value) |  | 25 | 25 | 25 | 25 | 25 |
| N-IZ (⅛") | kg · cm/cm | 80 | 80 | 10 | 80 | 12 |
| Gate impact destruction rate | % | 20%↓ | 0% | 100% | 0% | 100% |
| Mar resistance | Grade | 4 | 4 | 6 | 9 | 9 |

As shown in Table 2, the polycarbonate resin compositions including polyalkylaryl siloxane according to Examples 4 to 6 have remarkably improved mar resistance as compared with those according to Comparative Examples 3 and 4. FIG. 1 shows photographs of the specimens of Example 4 and Comparative Example 4 after a gate impact test. As shown in FIG. 1, for Comparative Example 4, the polycarbonate resin composition including a fatty acid ester lubricant instead of a siloxane surface conditioning agent has significantly reduced impact resistance.

TABLE 3

|  |  | Example 7 | Example 8 | Example 9 | Example 10 | Comparative Example 4 | Comparative Example 5 | Comparative Example 6 |
|---|---|---|---|---|---|---|---|---|
| (A) PC |  | 40 | 75 | 75 | 75 | 75 | 75 | 75 |
| (B) PC-Si |  | 40 | 25 | 25 | 25 | 25 | 25 | 25 |
| (C-1) |  | 2 | 2 | 2 | 2 | — | — | — |
| (C′) |  | — | — | — | — | 1 | — | — |
| (C″) |  | — | — | — | — | — | 2 | — |
| (D) Modified PMMA |  | 20 | — | — | — | — | — | — |
| (F) sPS |  | — | — | 1 | 2 | — | — | 2 |
| Blackness (L value) |  | — | 25 | 25 | 25 | 25 | 28 | 25 |
| N-IZ (⅛″) | kg·cm/cm | 4.5 | 80 | 80 | 80 | 12 | 80 | 12 |
| BSP width | μm | 255 | 320 | 320 | 320 | 320 | 320 | 320 |
| Gate impact destruction rate | % | 100% | 20%↓ | 10%↓ | 0% | 100% | 20%↓ | 0% |
| Mar resistance | Grade | 3 | 3 | 3 | 3 | 9 | 7 | 9 |

As shown in Table 3, when the amount of the surface conditioning agent is increased, mar resistance is further improved. Further, for Comparative Example 5, the polycarbonate resin composition prepared using siloxane having low refractive index has reduced blackness, causing deterioration of the appearance thereof.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A polycarbonate resin composition that can have high gloss and impact resistance and good surface properties, comprising:
    about 100 parts by weight of a base resin including a polycarbonate resin (A) and a polycarbonate-polysiloxane copolymer (B); and
    about 0.1 to about 10 parts by weight of polyalkylaryl siloxane (C) having a refractive index of about 1.42 to about 1.59, based on about 100 parts by weight of the base resin, wherein the polyalkylaryl siloxane (C) includes a repeat unit represented by the following Formula 3:

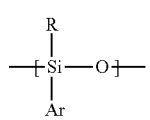

[Formula 3]

wherein R is substituted or unsubstituted C1 to C6 alkyl and Ar is substituted or unsubstituted C6 to C12 aryl; and wherein the base resin further includes greater than 0 wt % to about 40 wt % of a modified (meth)acrylic (co)polymer resin, wherein said modified (meth)acrylic (co) polymer resin is a (co)polymer including (d1) about 20 to about 100 wt % of an aromatic (meth)acrylate, alicyclic (meth)acrylate, or a combination thereof having a structure represented by Formula 4, Formula 5 or a combination thereof and (d2) 0 to about 80 wt % of a monofunctional unsaturated monomer:

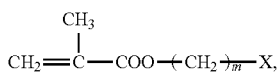

[Formula 4]

wherein:
m is an integer from 0 to 10, and
X is cyclohexyl, phenyl, methylphenyl, methylethylphenyl, propylphenyl, methoxyphenyl, cyclohexylphenyl, chlorophenol, bromophenyl, phenyphenyl group, or benzylphenyl, and

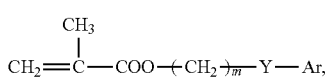

[Formula 5]

wherein:
m is an integer from 0 to 10,
Y is oxygen (O) or sulfur (S), and
Ar is cyclohexyl, phenyl, methylphenyl, methylethylphenyl, methoxyphenyl, cyclohexylphenyl, chlorophenol, bromophenyl, phenylphenyl or benzylphenyl.

2. The polycarbonate resin composition of claim 1, wherein said polyalkylaryl siloxane (C) has a weight average molecular weight of about 400 to about 1,000 g/mol.

3. The polycarbonate resin composition of claim 1, wherein said polyalkylaryl siloxane (C) has a viscosity of about 20 to about 120 mPa·s at 25° C.

4. The polycarbonate resin composition of claim 1, wherein said base resin comprises about 1 to about 99 wt % of the polycarbonate resin (A) and about 1 to about 99 wt % of the polycarbonate-polysiloxane copolymer (B).

5. The polycarbonate resin composition of claim 1, wherein said polycarbonate-polysiloxane copolymer (B)

comprises about 1 to about 99 wt % of a polycarbonate block and about 1 to about 99 wt % of a polysiloxane block.

6. The polycarbonate resin composition of claim 1, wherein said modified (meth)acrylic (co)polymer resin has a refractive index of about 1.495 to about 1.590.

7. The polycarbonate resin composition of claim 1, wherein said modified (meth)acrylic (co)polymer resin has a weight average molecular weight of about 5,000 to about 50,000 g/mol.

8. The polycarbonate resin composition of claim 1, wherein said monofunctional unsaturated monomer (d2) comprises an (meth)acrylic acid ester, unsaturated carboxylic acid, acid anhydride, hydroxyl group containing ester, amide, nitrile, allyl glycidyl ether, glycidyl methacrylate, styrenic monomer, or a combination thereof.

9. The polycarbonate resin composition of claim 1, wherein said polycarbonate resin composition further comprises about 0.1 to about 5 parts by weight of a fatty acid amide surface conditioning agent based on about 100 parts by weight of the base resin.

10. The polycarbonate resin composition of claim 1, wherein said polycarbonate resin composition further comprises about 5 parts by weight or less and greater than zero parts by weight of syndiotactic polystyrene based on about 100 parts by weight of the base resin.

11. The polycarbonate resin composition of claim 1, wherein said resin composition further comprises additive comprising an antimicrobial agent, a heat stabilizer, an antioxidant, a release agent, a photostablizer, an inorganic additive, a surfactant, a coupling agent, a plasticizer, an admixture, a stabilizer, a lubricant, an anti-static agent, a toning agent, a fire-proofing agent, a weather-proofing agent, a coloring agent, a UV absorbent, a UV blocking agent, a flame retardant, fillers, a nucleating agent, an adhesion aid, an adhesive, or a combination thereof.

12. A molded article comprising the polycarbonate resin composition of claim 1.

* * * * *

UNITED STATES PATENT AND TRADEMARK OFFICE
CERTIFICATE OF CORRECTION

PATENT NO.         : 8,829,091 B2                         Page 1 of 1
APPLICATION NO.    : 13/269653
DATED              : September 9, 2014
INVENTOR(S)        : Doo Han Ha et al.

It is certified that error appears in the above-identified patent and that said Letters Patent is hereby corrected as shown below:

In the Specification

Column 10, Line 58 reads: "The tatty acid amide surface conditioning agent may be a"
and should read: "The fatty acid amide surface conditioning agent may be a"

In the Claims

Claim 1, Column 16, Line 41 reads: "chlorophenol, bromophenyl, phenyphenyl group, or"
and should read: "chlorophenyl, bromophenyl, phenyphenyl group, or"

Claim 1, Column 16, Line 53 reads: "nyl, methoxyphenyl, cyclohexylphenyl, chlorophenol,"
and it should read: "nyl, methoxyphenyl, cyclohexylphenyl, chlorophenyl,"

Signed and Sealed this
Twenty-third Day of June, 2015

Michelle K. Lee
*Director of the United States Patent and Trademark Office*